June 24, 1930. T. R. WOLLASTON 1,767,952
GAS PRODUCER AND COMBINED FURNACE
Filed May 31, 1927 2 Sheets-Sheet 1
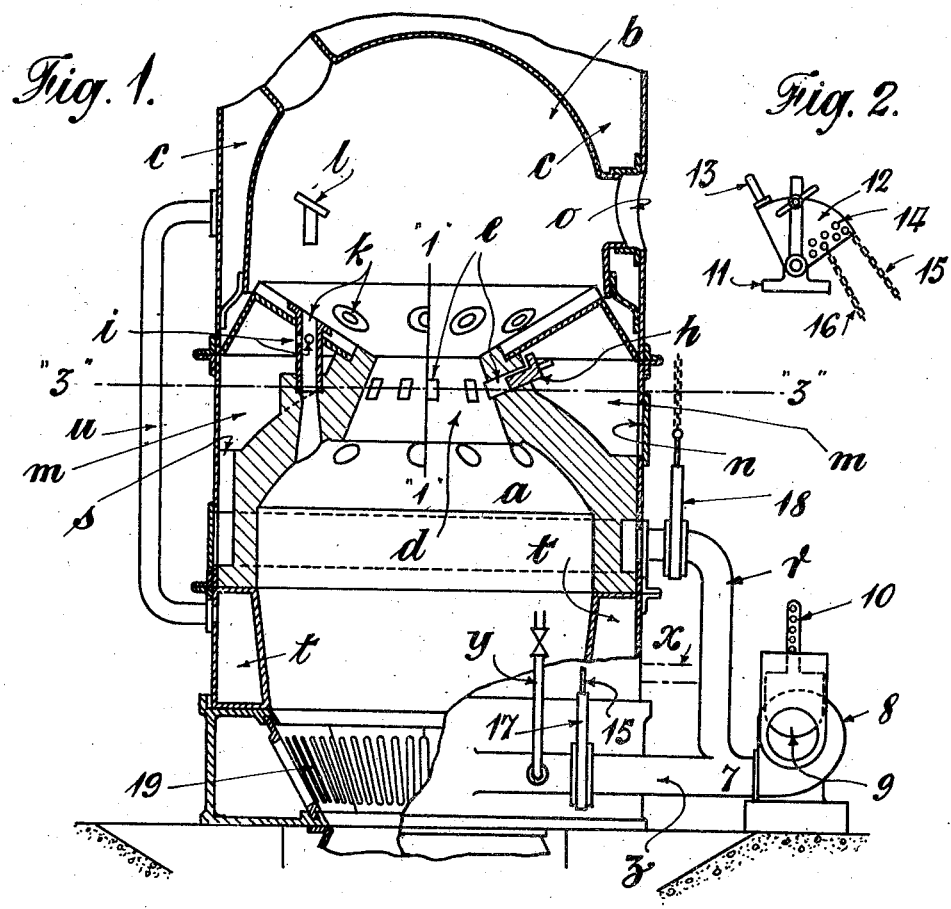
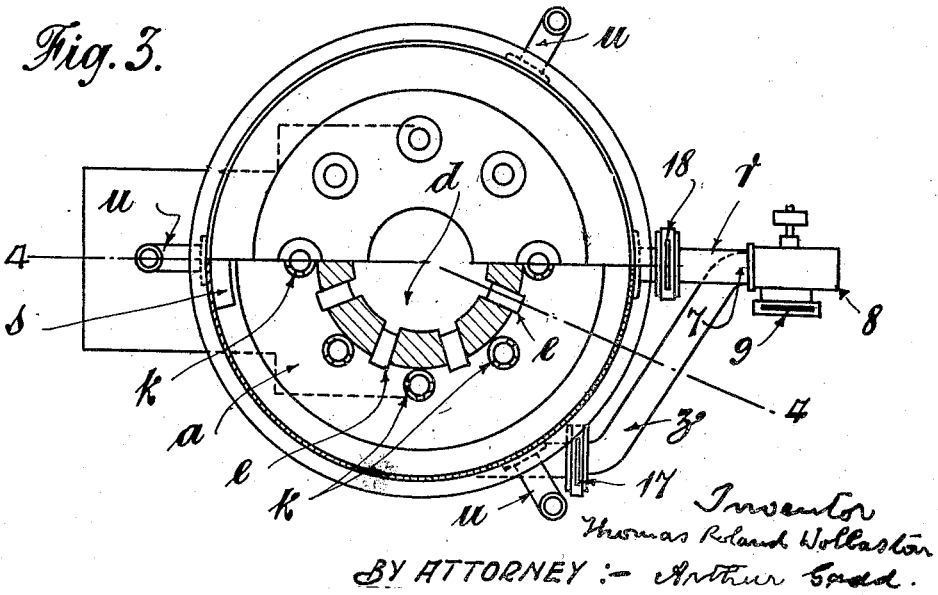

June 24, 1930.  T. R. WOLLASTON  1,767,952
GAS PRODUCER AND COMBINED FURNACE
Filed May 31, 1927    2 Sheets-Sheet 2
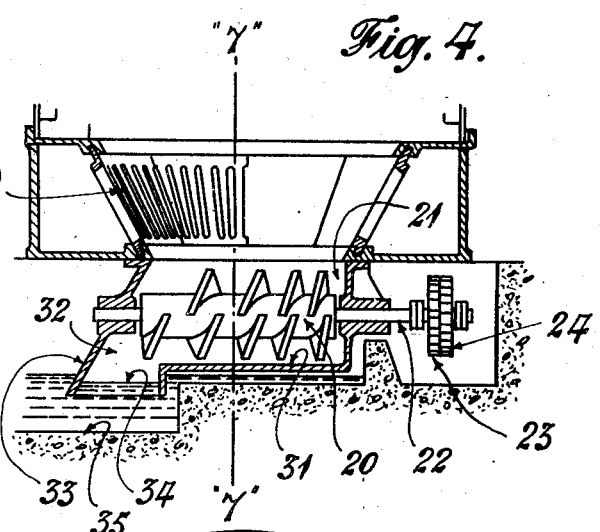
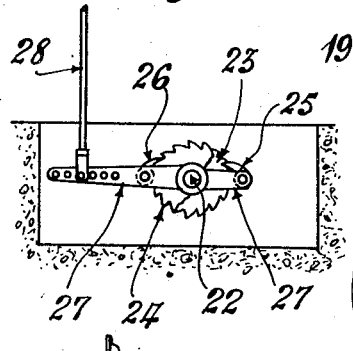
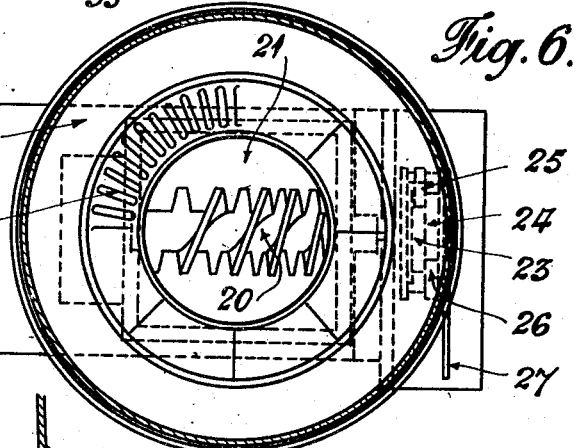
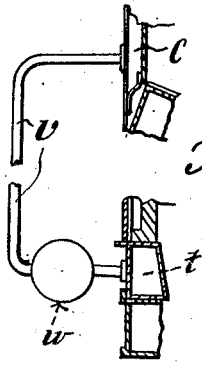
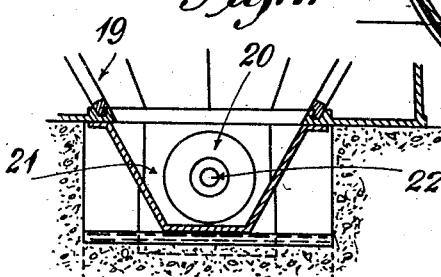
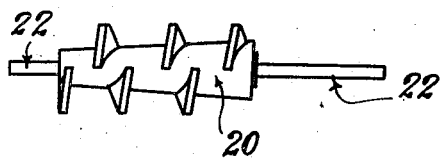
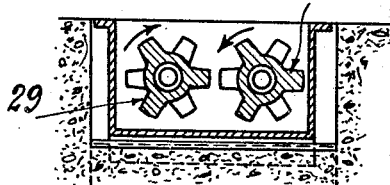
Inventor
Thomas Roland Wollaston
BY ATTORNEY:— Arthur Gadd.

Patented June 24, 1930

1,767,952

UNITED STATES PATENT OFFICE

THOMAS ROLAND WOLLASTON, OF MANCHESTER, ENGLAND

GAS PRODUCER AND COMBINED FURNACE

Application filed May 31, 1927, Serial No. 195,509, and in Great Britain August 3, 1926.

The invention relates to the selective control of the primary and secondary air supplied to, and the selective discharge of ash and clinker from, a gas producer having gas ports adapted for communication with the adjacent furnace of a boiler, the gas from the producer to be burnt in said furnace, and which selectiveness referred to enables fuels of widely varying qualities to be employed in said producer, with increased thermal efficiency.

The invention is particularly applicable to a modification of what is described and claimed in the specification of my British Patent No. 243,092, that is to say, there is provided a central throat and gas and air ports at the upper part of the producer, which ports are herein however capable of being closed independently at will by means of removable plugs.

The producer is provided with a jacket-space around the same, which space, when poor-quality fuels are being gasified, may contain water, whereby the radiant heat from the gas generating zones in the producer may be usefully absorbed. This arrangement under the circumstances referred to, tends to maintain the temperature of the gasification zone below the fusion point of the ash, and thus reduce clinker formation.

The water space named is capable of being in circulatory communication with the water space of the boiler concerned, thus increasing the efficiency of the system. Some of the hot water may also be supplied to the primary-air conduit or inlet of the producer, for being atomized thereat and for saturating the blast. Said water space is otherwise separated from the water space of said boiler.

The efficiency of the apparatus is increased according to my invention by controlling both the primary and secondary air supplies relatively by means of hand-operated mechanism, enabling a fixed relationship between the two supplies named to be established and maintained for a given working of the producer, the operation of said mechanism when so set resulting in alteration of both supplies without disturbing said ratio, or relationship.

For fuels with high moisture and ash content, it is very necessary that the producer grate be kept clear, as far as possible, having regard to the increased depth of fuel requisite in such case, the consequent retardation to passage of gas therethrough, and the cementing-together tendency of ash and clinker. I therefore make use of a form of helix device below the grate, adapted to break the clinker, and discharge the same and ash selectively in a downward direction under water with the aid of gravity, as distinguished from earlier central blast producers in which the helix, in addition to drawing ash from below the fuel bed, is utilized to force it up an incline for discharge above the water lever in the lute. In the gasification of poor quality fuels referred to, the clogging or cementing up tendency results in opposition to the discharge in an upward direction, hence the use of a downward discharge as herein described, and therefore increased efficiency of the apparatus.

In the accompanying drawings, Fig. 1 is a sectional elevation of a gas producer and (portion) of a furnace and boiler combined therewith, arranged or provided according to my invention. But the upper part of the producer left and right of line 1—1 is a sectional view through line 4—4 of Fig. 3.

Fig. 2 is a detail of mechanism relative to the predetermined control of the primary and secondary air supplied to the producer, and referred to herein.

Fig. 3 is respectively a half-plan (the boiler removed) and half a cross-section through line 3—3 of Fig. 1.

Fig. 4 shows in sectional elevation the lower portion of a gas producer provided with a helix device revolubly mounted below the grate, and adapted to discharge material in a downward direction into water, with the aid of gravity.

Fig. 5 is a detail of mechanism relative to the operation of the helix device named.

Fig. 6 is a sectional plan view of Fig. 4.

Fig. 7 is a sectional view through line 7—7 of Fig. 4, a helix portion being in elevation.

Fig. 8 is a modification of Fig. 7 and Fig. 9 a detail of a modified form of helix.

Fig. 10 shows a portion of Fig. 1 on a different scale, and with a modification of detail thereof.

With reference to Figs. 1, 3, 4 and 6, $a$ is a water-bottomed gas producer, and $b$ a furnace combined therewith, in this example forming part of a boiler, a portion of the water space of which being indicated at $c$. $d$ is a throat (Figs. 1 and 3) or communication between the interior of the producer $a$ and the furnace $b$, and provided with secondary-air inlets or ports $e$ according to the patent herein referred to. But said ports are capable of being closed by means of firebrick plugs, one of which is shown at $h$ in Fig. 1. $k$ are burners, or gas ports, also according to the prior patent referred to, but herein capable of being closed, such as by firebrick plugs, one of which being shown detached at $l$. Inlets for secondary-air are indicated at $i$. Means for obtaining access to the plugs $h$, and inlets of the burners $k$ are shown provided in the form of a space or cavity around the producer and shown at $m$. Hand holes such as $n$ in Fig. 1 are indicated, for manipulation of the plugs $h$, but the plugs $l$ may be applied by use of the fire-door $o$ of the boiler furnace.

Secondary air for the inlets $e$ and $i$ as required is, in the present example, capable of passing thereto from an inlet $s$ to the space $m$, which outlet forms the termination of a continuation of the secondary-air conduit, said continuation passing round the producer in annular manner as shown, and hereinafter referred to.

$t$ is a jacket-space surrounding the lower part of the producer, which is employed as a water-jacket, or filled with water, at those times when such a water space is desirable during the gasification of poor-quality fuels. But said water space may be permanently maintained.

$u$ indicate pipes for communication between the water space $t$ with the water space of the boiler concerned, and whereby the circulation of hot water between the two may be attained, or the heat, which would otherwise be radiated from the walls of the producer and be wasted, is made use of in manner stated.

In Fig. 10, piping $v$ and interposed pump $w$ are indicated in diagrammatic manner merely, to show that when the water space $t$ is not under boiler pressure the communication referred to may be established by water being pumped into the water space of the boiler concerned. An inlet for water supply to space $t$ is shown at $x$ in Fig. 1.

The water-jacket referred to is also useful as a conserver of heat during "stand-by" periods, and the producer is required after such a period to be re-started without undue delay.

Hot water for being atomized at the primary air inlet or conduit may be taken from the water space $t$, and for this purpose a valve-provided pipe $y$ is indicated in Fig. 1 forming a communication between said water space and said primary air conduit $z$.

The primary and secondary air conduits $z$ and $r$ respectively form branches of a common pipe or conduit 7, provided with fan device 8 for supplying air under pressure. The suction side of said fan is here shown provided with a damper or control valve 9, the movement of the same determining the extent of opening of said suction or the total quantity of air supplied at any given time for a given speed of the fan. This movement, in the example given, is regulated in extent by the position of a pin (not shown) in one of the holes indicated and formed in an extension 10 of the damper 9, as will be understood. But the operation for determining the extent of movement is not limited to any particular method.

For regulating the relative quantities of air supplied by the primary and secondary conduits, the device shown in Fig. 2 and herein termed a valve controller consists of a support 11 fixed to any suitable stationary part of the apparatus or adjacent area, to which support is pivoted a plate 12, in more or less quadrant form, having a handle 13. To holes 14 in said plate, chains or connections 15 and 16 are capable of being variably and relatively attached by the engineer-in-charge for example, and the chains 15 and 16 may be respectively in connection with the dampers or valves 17 and 18 for the air conduits concerned. The radial distances of the chain ends from the pivot at support 11, as well as the particular row of holes involved in each case, will determine the relative movements of the valves 17 and 18, when the handle 13 alone is manipulated by the ordinary operator in charge of the producer. In this way, the controller may be set for one particular relationship between quantities of primary and secondary air to be maintained throughout the working of the producer for a particular class of fuel, the total quantity of air so regulated being under main control at such as valve 9.

The controller described will be seen to operate here as a dual-lever device.

It will thus be seen that the correct relative proportions of primary and secondary air having first been set or determined by operation of the mechanism controlling the valves 17 and 18, the total quantity of air so supplied is afterwards determined by the operation of the damper or valve 9.

I prefer to make use of a basket form of grate, such as partly illustrated at 19 through which the primary air is injected.

The helix device revolubly mounted below said grate, here consists of a helix 20, in bearings at each end formed in the walls of a chamber or space 21. In the example shown, the helix is formed with discontinuous or saw-like helices or teeth of uniform diameter, but varying pitch increasing towards the left, so as to draw material evenly across the whole area of the grate.

At the end of shaft 22 attached to helix 20 is indicated a pair of ratchet wheels 23, 24, by which the shaft and helix may be revolved. The wheels are shown capable of being driven in opposite directions, by means of pawls 25 and 26 respectively, pivoted on a rocking frame 27 loosely mounted on shaft 22. An extension or arm of the frame is shown capable of operation by a connected link 28 itself assumed to have a reciprocatory movement. Holes in said arm as shown in Fig. 5 enables the point of connection referred to, to be altered. In this way the helix, if requisite, may have alternating directions of movement imparted to it, the extent thereof being capable of variation. But only one pawl of the pair named could be in gear at a time if desirable. In Fig. 8 a helix device consisting of a pair of members 29 and 30 is illustrated, the members being capable of opposite rotations as indicated by arrow lines. In Fig. 9 a helix with hub in taper form is shown, the pitch of the teeth being uniform.

In Fig. 4, below the space 21 is a flooring 31, and at one extreme of said space is a cavity 32, here provided with a spout 33 and a liquid seal at 34.

In operation, the helix, such as 20, whilst revolving, tends to crush the falling material from the grate 19 above, as well as move said material along the flooring 31.

Material is thus eventually pushed or dragged into the space or cavity 32 falling by gravity to a lower level, such as 35, from which the same may be removed. When not required the helix device 20 could be dismounted or the casting or casing forming space 21 detached and another of ordinary kind substituted therefor.

I claim:—

In a gas producer combined with a furnace, an air supply conduit therefor, said conduit having a branch conduit leading to the producer, and a second branch conduit leading to the furnace, a valve for said air supply conduit, a valve in each of said branch conduits, and manually operable means connected to last-named valves whereby they may be set to control the supply of air through the branches in fixed pre-determined relative proportions, as herein set forth.

In testimony whereof he hath affixed his signature.

THOMAS ROLAND WOLLASTON.